United States Patent

Palmer

[15] 3,635,627
[45] Jan. 18, 1972

[54] CALENDER SHEETING THICKNESS CORRECTION CONTROL SYSTEM

[72] Inventor: Franklin E. Palmer, 4821 Ranchwood Road, Akron, Ohio 44313

[22] Filed: Sept. 5, 1969

[21] Appl. No.: 855,482

[52] U.S. Cl............................................................425/141
[51] Int. Cl...............................................................B29c 3/06
[58] Field of Search........................18/2 HA, 2 C, 2 F, 2 L, 9, 18/10

[56] References Cited

UNITED STATES PATENTS

| | | | |
|---|---|---|---|
| 2,750,986 | 6/1956 | Russell et al.................... | 18/2 HA UX |
| 3,186,200 | 6/1965 | Maxwell.............................. | 18/2 HA |
| 3,286,302 | 11/1966 | Doering ............................. | 18/2 HA |
| 3,292,208 | 12/1966 | Wood.................................. | 18/2 HA |

FOREIGN PATENTS OR APPLICATIONS 856,454 1960 Great Britain..........................18/2 C Primary Examiner—H. A. Kilby, Jr.
Attorney—Kemon, Palmer and Estabrook, Frank C. Rote, Jr. and Harry F. Pepper, Jr.

[57] ABSTRACT

There is disclosed an automatic control system for maintaining the thickness of a multilayer or multilaminae flowsheet of rubber or plastic material. The system includes a plurality of screwdown motors for controlling calender roll separation and a plurality of selsyn systems responsive to screwdown movement and connected in a feedback control system to selectively deenergize the screwdown motors to control correction of laminae thickness. The laminae thickness feedback control system is operable with a beta gauge sheet thickness maintenance control, where the latter control operates to maintain total sheet thickness at a predetermined value.

7 Claims, 4 Drawing Figures

3,635,627

CALENDER SHEETING THICKNESS CORRECTION CONTROL SYSTEM

FIELD OF THE INVENTION

This invention relates to calendering apparatus, and more particularly to controls and their circuits for maintaining the thickness of a sheet of material and particularly a laminar sheet at a predetermined value.

The prior art has provided devices for sensing the thickness of a material strip issuing from a rolling mill or calender machine to generate a thickness correctional control signal(s). The signal(s) is usually used to control the nip or separation between a pair of rolls such that the material strip is maintained at or brought to a predetermined thickness. Such prior art devices usually employ a beta gauge for the purpose of determining actual thickness, and signals outputted from the beta gauge are usually compared to a reference value. If a differential exists between the beta gauge signals and the reference, a control signal is applied to one or more reversibly drivable screwdown motors to change the separation between calender rolls. Such devices function to maintain the overall thickness of the sheet material. However, if the sheet is laminar, i.e., composed of two or more laminae or layers with or without material sandwiched between the layers an overall thickness correctional control, as described, does not generally provide an economical and effective control over the thickness of each laminae or layer of the output strip material. Consequently, when prior art devices of the thickness maintenance type are employed with laminated or sandwiched flow strips, the overall thickness of the strips may correspond to the reference, but the individual layers of material may vary in thickness from each other or from different references required for each of the layers.

It is the principal object of this invention to provide a new and useful thickness maintenance control system for a sheeting calender producing a multilayer sheet.

It is an object of this invention to provide a new and useful control system for automatically regulating the movement of a plurality of screwdown devices operated by a sheeting calender thickness maintenance control system so as to control the thickness of individual layers of a laminar sheet produced by the sheeting calender.

It is a further object of this invention to provide a plurality of signal generators operable by the movement of screwdown devices in a multilayer sheeting calender to effect selective control of the energization of the screwdown devices so as to control the thickness of the individual layers of the sheet produced by the calender.

It is an additional object of this invention to provide a plurality of signal generators sequentially responsive to screwdown movement on each side of the rolls of a sheeting calender producing a multilayer sheet to operate a screwdown motor control system so as to regulate the energization of individual screwdown motors to provide control of the thickness of the layers of the sheet.

These and other objects of the invention will become apparent upon a study of the hereinafter description of the preferred embodiment taken in conjunction with accompanying drawings in which.

DESCRIPTION OF PREFERRED EMBODIMENT

Machines for controlling the thickness of a sheet of material such as rubber or plastic formed by and issuing from a plurality of calender rolls have been known. Usually a thickness-measuring gauge, such as a beta gauge, is arranged alongside of the edges of the sheet material to obtain a signal representative of the total thickness of the sheet at the edges. In some prior art installations, gauges are arranged on both sides of the sheet, and in others, a gauge is moved by a stepping mechanism from one edge of the sheet to the other edge and then to the center area of the sheet. An example of apparatus utilizing the latter described approach is disclosed in U.S. Pat. No. 3,006,225, to L. G. Mamas. In both types of apparatus, signals obtained from the measuring devices are compared with reference values, such as references voltages in appropriate comparator apparatus. If a difference exists between the reference values and the measured values, then the comparator apparatus outputs an error control signal to effect the energization of a screwdown motor or motors. The screwdown motor (or motors) in turn responds to the correction called for by either increasing or decreasing the separation gap between the calender rolls used to produce the sheet material. In addition, apparatus such as that taught by the above referred to patent also provides correctional signals that are used to make profile adjustments, such as a cross axis adjustments, in the thickness of the sheet by adjusting the calender rolls on an axis at right angles to the screwdown adjustment axis.

Figure 1:
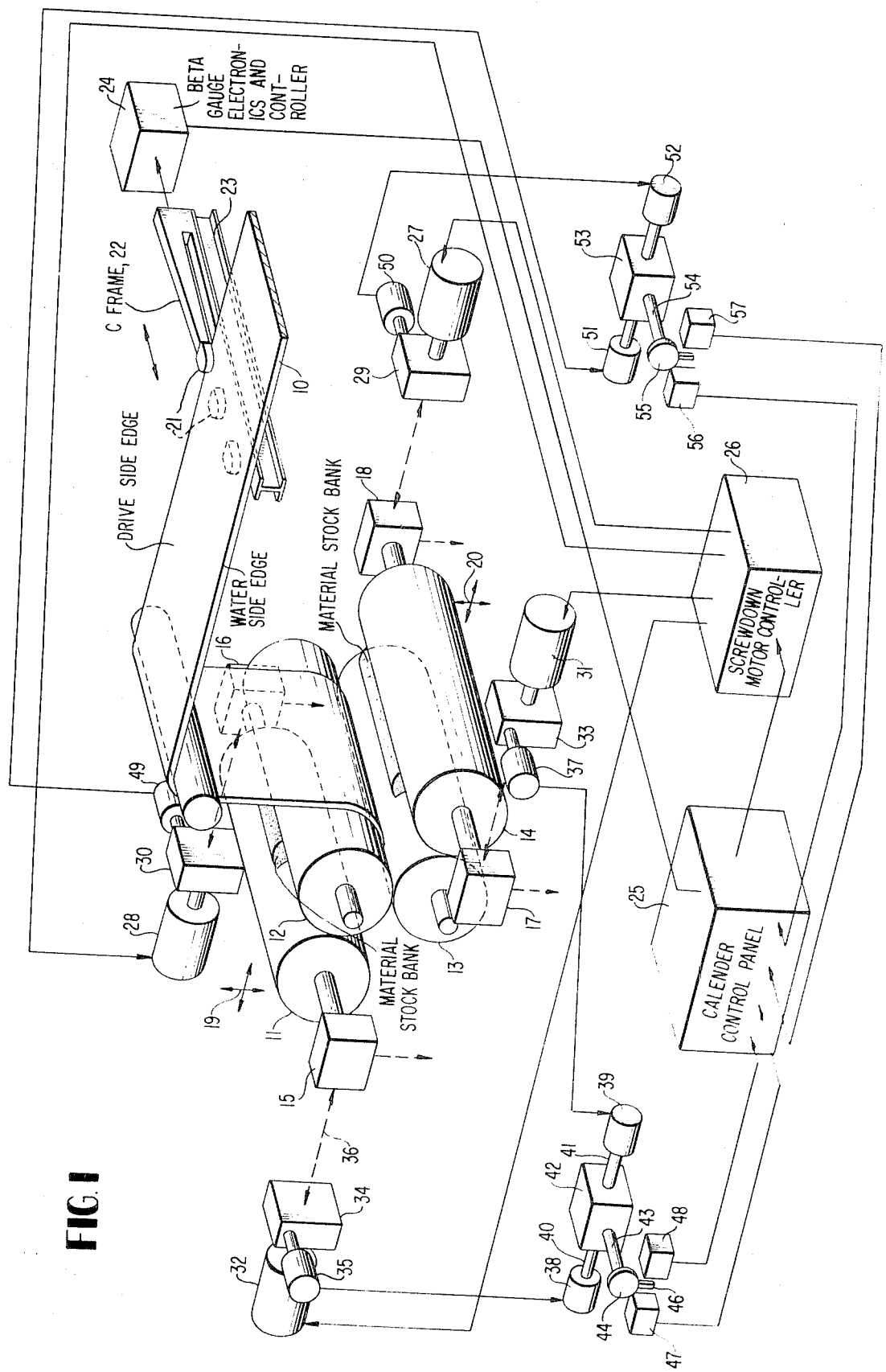
FIG. 1 is an illustration in block and pictorial diagram form of the thickness maintenance control system of the present invention.

The preferred embodiment of the invention is shown in block-pictorial diagram form in FIG. 1 of the drawings. The apparatus and controls there shown are used to produce a sheet 10 of rubber having tire cords sandwiched between two laminae or layers where each layer is required to be generally equal to the other layer in thickness. The upper layer is produced in the usual manner by a first set of two coacting calender rolls 11 and 12, and the bottom layer of the sheet is similarly produced by a second pair of coacting rolls 13 and 14. The rolls are supported such that the sheet 10 is formed by the cooperative action of the rolls 12 and 13. The tire cords may be introduced between the laminae of the sheet 10 in the usual manner, i.e., by inserting them at the entry point between the rolls 12 and 13.

Each of the several calender rolls is supported for rotation about its major or longitudinally extending axis in a pair of journal blocks or boxes. The journal blocks for each of the rolls 11, 12, and 14 are in turn supported for movement along ways in the usual structure; the supporting structure and ways as such have not been shown in that they are conventional. As shown in FIG. 1, the roll 11 is supported for rotation in a pair of journal boxes 15 and 16, and similarly, the roll 14 is supported in a pair of journal boxes 17 and 18. The journal boxes 15 through 18 are each independently movable in horizontal and vertical planes such that the roll 11 can be moved horizontally relative to the roll 12 for screwdown purposes and vertically relative to the roll 12 to provide cross axis adjustment. Similarly, the roll 14 is supported in its journal boxes for screwdown movement and cross axis adjustment relative to the roll 13. The directions of movement for the rolls 11 and 14 are shown by direction-indicating arrows 19 and 20 respectively. Mechanical movement in the vertical direction is provided in the usual manner and has been represented by broken lines extending downwardly of the journal boxes. In that the present invention does not require the use of cross axis adjustment no other details need be given here. It is also contemplated that the roll 12 be moved vertically for screwdown relative to the roll 13, but a discussion of such movement is unnecessary to an understanding of the invention. Similarly, a discussion of the calender roll drive motors, their circuits, and the mechanical coupling of the drive motors to the calender rolls is not deemed necessary in that it too is conventional.

In the preferred embodiment of the invention, apparatus and control circuits similar to the types disclosed in U.S. Pat. No. 3,006,225, are employed to determine the overall thickness of the sheet 10 and to effect automatic screwdown between the rolls 11 and 12 and between the rolls 13 and 14. To this end a conventional beta gauge detector head 21 is mounted on an elongated C-shaped frame 22, and it is supported for movement transversely of the sheet 10 by a rail 23.

In operation, the detector head measures the thickness of the sheet 10 at one edge thereof, e.g., the drive side edge shown to the right in the drawing, and it outputs a signal representative of sheet thickness at the edge to a beta gauge controller and electronics 24. The signal is then compared with an arbitrary reference signal indicative of a desired thickness. If a difference exists, the beta gauge electronics 24 outputs an error signal indicative of the magnitude and direction of the error.

The error signal is then electrically routed through a calender control panel 25 to a screwdown motor controller 26. The control panel includes manually operable switches, some of which will be referred to below. The error signal is utilized by the motor controller 26 to simultaneously energize a pair of screwdown motors 27 and 28. The motor 27 controls the gap separation of the rolls 13 and 14 on the drive side, and the motor 28 fulfills the same function for the rolls 11 and 12. To these ends, the motor 27 is mechanically coupled to the journal box 18 through a conventional speed reducer 29, and the motor 28 is coupled to the journal box 16 through a similar speed reducer 30. Accordingly, the error signal effects the simultaneous energization of the motors 27 and 28, and it causes the motors, depending on the direction of the error, to either increase or decrease the separation between the rolls 13 and 14 and the rolls 11 and 12 simultaneously on the drive side thereof.

Thereafter, the detector 21 is moved by the controller 24 to the other side of the sheet 10, i.e., the waterside, and the above-described operation is repeated. Again, if an error in overall sheet thickness is determined, a signal is applied to the screwdown controller 26. The controller 26 then effects the simultaneous energization of a second pair of screwdown motors 31 and 32 located so as to effect screwdown on the waterside of the calender rolls. The motor 31 is drivingly coupled to the journal box 17 through a reducer 33, and the motor 32 is coupled to the journal box 15 through a speed reducer 34. Accordingly, roll separation for both sets of calender rolls is automatically and sequentially adjusted in a direction so as to eliminate overall thickness error.

It should be apparent from the above-given description, that an overall thickness error signal is employed to simultaneously correct the thickness in each of the laminae or layers comprising the sheet 10. However, because of the inherent differences, e.g., tolerance differences, in both the electrical and mechanical components of the system, a second and significant error is introduced. This error, among others, can and does cause a difference in the amount of screwdown movement achieved between the rolls 11 and 12 and that achieved by the rolls 13 and 14 such that the laminae or layers produced by each set of rolls are unequal in thickness during correction and subsequent to correction by the beta gauge control. Thereafter, a subsequent measurement made by the beta gauge detector may show the overall thickness of the sheet to be correct or within tolerable limits notwithstanding the fact that the layers forming the sheet 10 are of different and erroneous thicknesses. If the sandwich being produced is a tire ply, the end result may be that it is defective for its intended use and consequently the error can result in important economic wastage. The type of error described above can be of even greater importance when the laminae or layers forming the sheet 10 must be of predetermined different thicknesses.

In the preferred embodiment, the above-described cumulative error is substantially eliminated by employing a second sensing means operating in cooperation with the beta gauge system to selectively deenergize either of the motors 27 and 28 or the motors 31 and 32 during those periods that the beta gauge control is calling for their simultaneous operation.

To achieve the desired result, signal generators are provided to output signals representative of achieved screwdown movement during thickness correctional periods. The signals obtained are used to control the energization of the screwdown motors.

Referring to FIG. 1, a selsyn transmitter 35, is shown supported so as to be driven by the motor reducer 34 as by a power takeoff at a position adjacent to the journal-adjusting screw for the journal box 15. The journal-adjusting screw is shown by a dashed line 36. Similarly, a second selsyn transmitter 37 is energized through the speed reducer 33 so as to measure motion imparted to the journal screw for the box 17. Power takeoffs at the described points were chosen so as to avoid errors in measurement attributable to gear backlash. In addition, power takeoffs at these points avoid the effects of cumulative system errors in signals applied to the motors, and they avoid additional error introduced by the motors, i.e., introduced as a result of the inherent differences in the mechanical and electrical motor structures.

Each of the transmitting selsyns 35 and 37 is coupled to a follower or receiving selsyn 38 and 39 respectively. As in the usual selsyn system, e.g., compass repeaters, movement imparted to the transmitting selsyns is precisely reproduced by the receiving selsyns in that the rotor of each selsyn receiver is turned through the same angle as the rotor of the associated transmitter selsyn. In apparatus constructed with the preferred embodiment, 1 revolution of a selsyn transmitter rotor is representative of 1 mil (0.001 inch) of screwdown movement between a set of calender rolls. Accordingly, 1 revolution of a receiving selsyn's rotor also corresponds to a change of 1 mil in the gap between the calender rolls.

The receivers 38 and 39 are connected by selsyn rotor output shafts 40 and 41 respectively to drive a mechanical differential 42. The differential 42 is of usual construction. It responds to differences in angular movement of the shafts 40 and 41 by turning a differential 42 output shaft 43 having a switch operator 44 supported thereon. The operator 44, in practice, is a cam having a switch-operating arm or nipple 46 thereon. The arm 46 is arranged such that if the selsyn shaft 40 is turned a predetermined amount greater than the angle through which the selsyn output shaft 41 is turned, the arm 45 is turned sufficiently to operate a switch 47. In the converse case, the arm 46 is rotated in the opposite direction to operate a switch 41. Accordingly, if the gear ratio of the differential 42 is 1:1, and if the switches 47 and 48 are located so as to be operated by 90° of revolution of the operator 44, then a switch 47 or 48 is operated if there is a differential of 0.25 mils in the correctional screwdown movement of the sets of calender rolls. In point of fact, greater accuracies can be achieved. For example, by utilizing a gear ratio of 3:1 in the differential 42, 360° of cam movement corresponds to 0.33 mils, of horizontal roll movement. The angle can be subdivided by making the operator 44 adjustable such that a differential horizontal movement of 0.1 mil turns the cam 44 a sufficient amount to operate one or the other of the switches 47 or 48.

The system above-described is duplicated on the drive side of the calender roll sets to correct for erroneous differential screwdown movement between the rolls of the sets on that side. To this end a pair of transmitting selsyns 49 and 50 operate into a pair of receivers 51 and 52 respectively. The transmitter 49 responds to screwdown adjustment for the rolls 11 and 12, and the transmitter 50 responds to screwdown movement of the rolls 13 and 14. The receivers work into a mechanical differential 53 such that an output shaft 54 carrying a switch operator 55 responds, as above described, with respect to the waterside movement-sensing system. The operator 55 is effective to operate either of two switches 56 and 57.

The switches 47, 48, 56, and 57 are electrically connected in the screwdown motor controller and are effective when operated to deenergize their associated screwdown motors. Accordingly, when the beta gauge detector 21 calls for waterside overall thickness correction and a defined differential in roll movement between the roll sets is detected by the selsyns, either the switch 47 or the switch 48 is operated to shutdown the motor producing the greater movement. The other screwdown motor then causes the other set of rolls to catch up. When catch up is achieved and if the beta gauge is still calling for screwdown adjustment, the deenergized screwdown motor is reactivated in that during deenergization the operator 44 was rotated in the reverse direction as a result of the sole input to the differential 42.

Figure 2A:
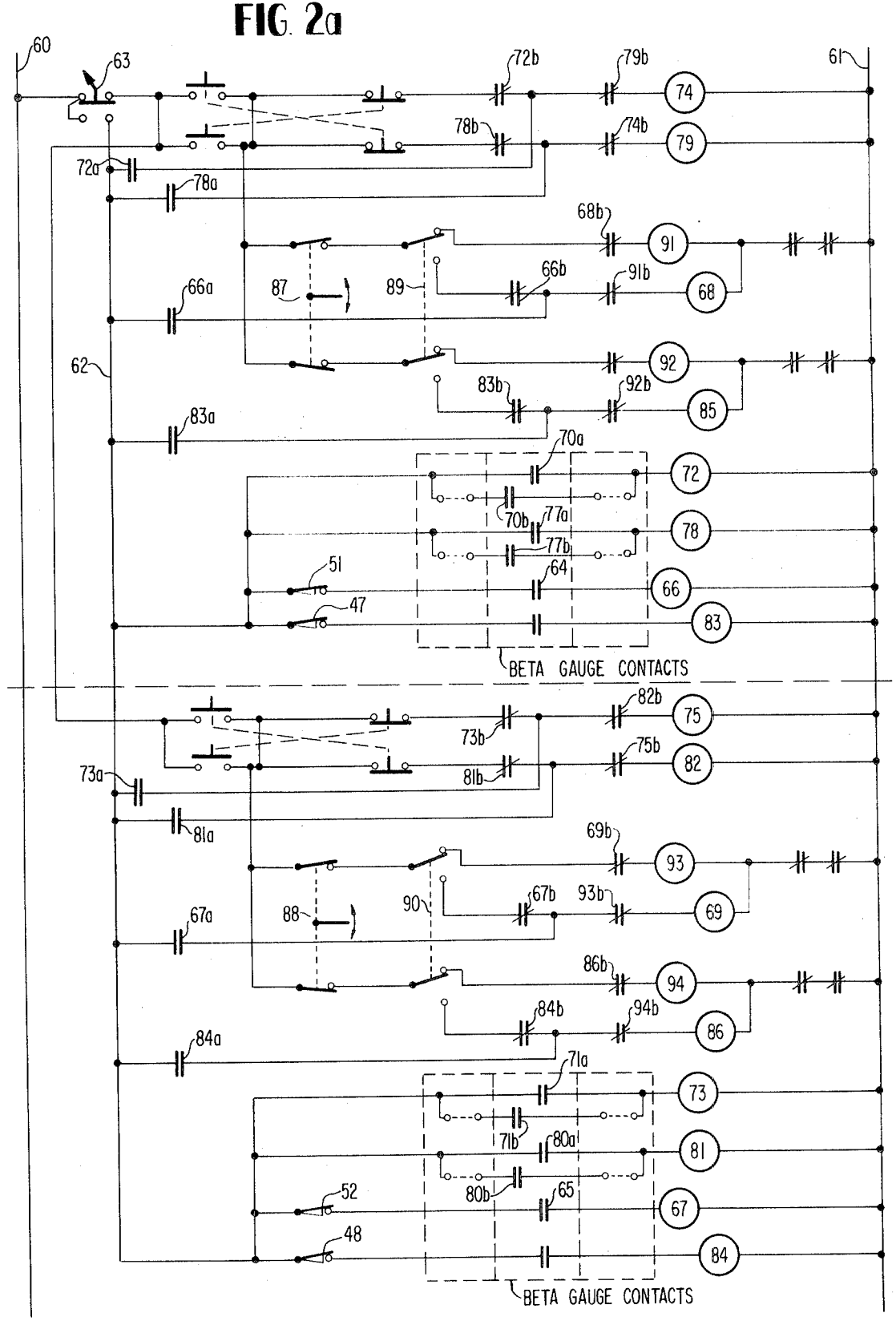
FIGS. 2a and 2b are detailed wiring diagrams of the electrical control system employed in the system of FIG. 1; and, FIG. 3 is a wiring diagram of a plurality of screwdown motors operatively and automatically controlled by the circuits shown in FIGS. 2a and 2b.
Figure 2B:
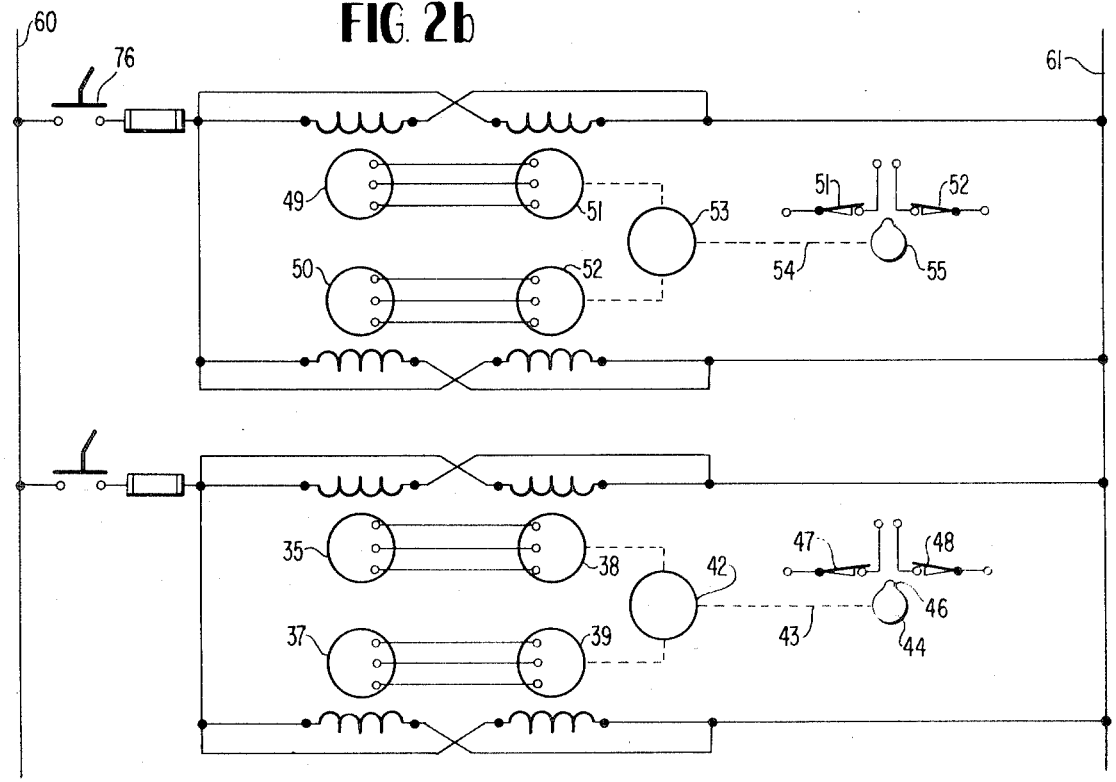
Figure 3:
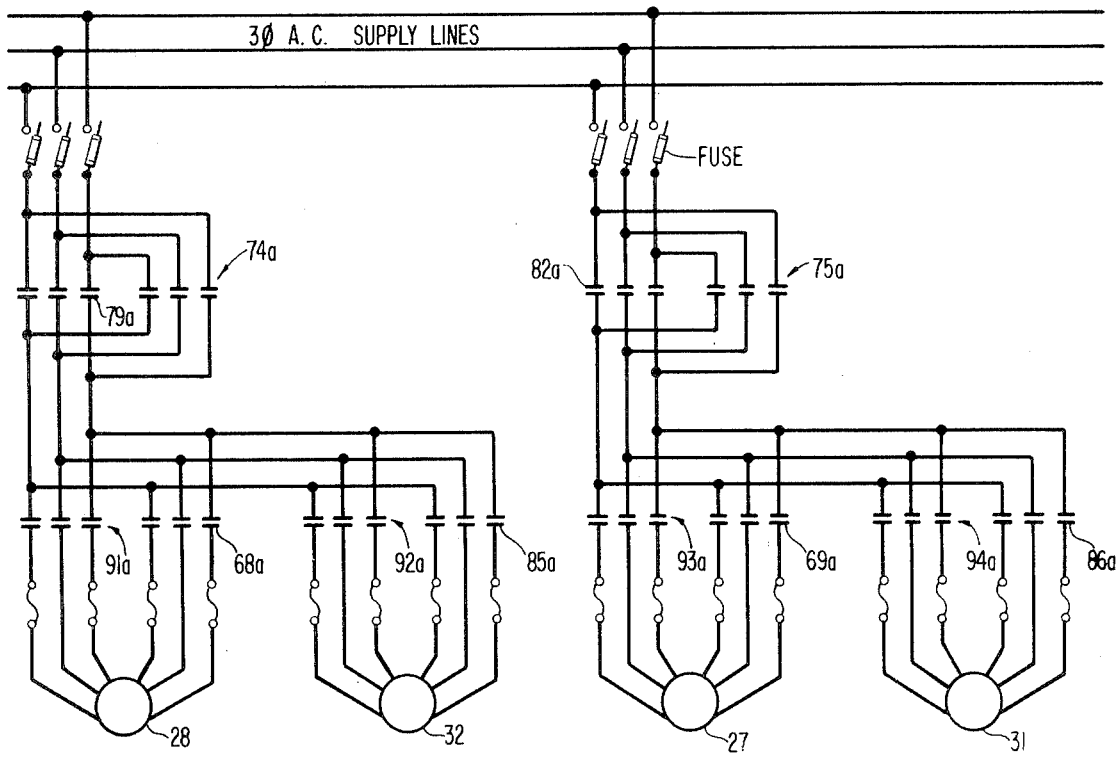

Reference will be had to FIGS. 2a, 2b, and 3 for the purpose of describing electrical controls utilizable with the preferred embodiment. All relays and their contacts appearing in these Figures are shown as normally deenergized. Referring to FIGS. 2a and 2b, 115 VAC power is supplied from a pair of buses 60 and 61 to screwdown motor control and signal relays, FIG. 2a, and to the selsyn systems, FIG. 2b, described above. As in the usual case, one of the AC buses may be at ground potential. When the control is to be operated in an automatic mode, the AC power is supplied to a second bus 62 through a manual-automatic switch 63; the switch is shown closed for manual screwdown control, and for purposes of the following description the switch 63 will be assumed reversed in position from that shown in FIG. 2a. In addition, for purposes of ease in understanding the circuitry, a dashed line has been employed in FIG. 2a to separate the controls into an upper group for the motors 28 and 32 and a lower group for the motors 27 and 31.

Assuming that the beta gauge detector 21 is located to determine the thickness of the sheet 10 on the drive side, and further assuming that correction is called for, a pair of contacts 64 and 65 located in the beta gauge electronics are closed by their respective relays. With the contacts 64 and 65 closed, a pair of drive side relays 66 and 67, respectively, are energized and reverse their contacts. The relay 66 is energized over a circuit from the bus 62, through the drive side selsyn system switch 51, the now closed contacts 64, and to the bus 61. With the relay 66 energized, its contacts 66a reverse to thereby complete a circuit from the bus 62 to a motor low-speed selector relay 68 and to bus 61. Upon the completion of this circuit, the low-speed selector relay energizes and effects a reversal of its contacts 68a; see FIG. 3. The contacts 68a are located in low-voltage polyphase supply lines for the screwdown motor 28.

With the contacts 65 closed, the relay 67 was energized from the bus 62 through the other drive side selsyn system switch 52, to reverse its contacts 67a and thereby energize a second low-speed selector relay 69. With the relay 69 energized, its contacts 69a (FIG. 3) connect low-voltage supply lines to the screwdown motor 27.

The beta gauge detector, as stated above, determines whether the sheet is too thick or thin. Assuming that the beta gauge calls for an increase in roll separation on the drive side, then a pair of contacts 70a and 71a (FIG. 2a) are closed to energize a pair of relays 72 and 73 respectively. Relay 72 reverses its contacts and effects energization of a motor open direction selector relay 74 for the motor 28. Similarly, relay 73 reversed its contacts 73a to effect energization of a motor open direction selector relay 75. The direction selector relays 74 and 75 reverse their respective contacts 74a and 75a such that polyphase power is supplied from the usual supply lines to the drive side screwdown motors 27 and 28. The motors are thus energized over low-speed supply lines to cause an increase in the separation of the calender rolls of the roll sets on the drive side.

Referring to FIG. 2b, prior to the commencement of the above-described operation, a switch 76 was closed at the control panel 25, such that AC power was supplied in parallel to the rotors of the selsyn transmitters 49 and 50 and to the rotors of the selsyn receivers 51 and 52 so that both selsyn systems are energized equally from the same source. With the rotors in electrical balance, the voltages induced in the stators (which are shown as circles connected by the usual three phase connections) are also in balance. A selsyn system is such that as the rotor for a transmitter is turned, e.g., by journal screw movement, the induced voltages in the stator for the transmitter change. In that the receiver stator windings are connected in parallel to the transmitter stator windings, the voltages in the receiver stator follow those of the transmitter stator. Consequently, a magnetic unbalancing occurs at the receiver such that its rotor restores the balance by turning with the transmitter rotor.

As was described above, the rotors shafts are connected so as to exert oppositely directed torques on the differential 50. Since the rotors of the two selsyn systems are initially balanced, any differential in movement of the two selsyn transmitter rotors corresponding to a differential of screwdown movement between the roll sets results in a turning of the differential output shaft 54. If a sufficient differential movement takes place, e.g., roll 11 is moved a horizontal distance of 0.1 mil more than roll 14, then the switch 51 is opened.

Referring back to FIGS. 2a and 2b, it will be recalled that switch 51 is in the energization circuit for the drive side relay 66. With the switch 51 open, the relay deactivates and its contacts 66a open to thereby deactivate low-speed selector relay 68 for the motor 28. Consequently, the low-speed voltage for the motor is removed, and the motor is deenergized.

Referring to FIG. 2a, in the event that the beta gauge had called for a closing of the rolls, i.e., the sheet 10 measured out as too thick, then a pair of contacts 77a close to effect energization of a close selector relay 78. The relay 78 reverses its contacts 78a to thereby energize a screwdown motor close direction selector relay 79. Reference to FIG. 3 will make it apparent that operation of the relay 79 caused its contacts 79a to reverse such that the direction of rotation of the fields in the motor 28 is reversed from that previously used for a roll-opening operation. As with roll opening, the speed of operation is at low speed.

A pair of contacts 80a for motor 27 control were closed with the contacts 77a such that a relay 81 energized to reverse its contacts 81a. Reversal of the contacts 81a effected energization of a screwdown motor close direction selector relay 82 such that its contacts 82a close to apply a reverse direction field to the motor 27.

It is believed that the above explanation given with respect to drive side control is sufficient to understand the waterside controls. The circuitry for selecting the direction of rotation of the screwdown motors is the same on both sides. However, separate speed and waterside controls are provided in order that waterside edge of the laminae of the sheet 10 may be independently corrected. To this end the switches 47 and 48 are connected in the energization circuits for waterside relays 83 and 84 respectively. The relays through their respective contacts 83a and 84a in turn energize respective waterside motor low-speed selector relays 85 and 86. The relays 85 and 86 are provided with contacts 85a and 86a for setting the waterside motors 32 and 31 respectively for low-speed operation. Selective deenergization to correct for differential screwdown movement is accomplished by the waterside selsyn systems operating on the switches 47 and 48 in the same manner as described above with respect to the drive side. For waterside operation, the relays 72, 78, 73, and 81 are operated by the beta gauge's selective operation of the respective contacts 70b, 77b, 71b, and 80b.

As was stated above, the system may be operated in manual mode by changing the position of the switch 63. When in such a mode, the automatic system above described is rendered inoperative. In manual operation, power is supplied selectively to the direction selector and speed relays through hand operated switches. Three-position switches 87 and 88 permit the operator to selectively open or close the calender rolls on either side or both sides at the same time. In addition, switches 89 and 90 are provided in order that the operator may select high- or low-speed screwdown movement. With the switches 89 and 90 in the positions shown in FIG. 2a, a group of relays, 91, 92, 93, and 94 can be energized to effect high-speed adjustment of roll separation.

A preferred embodiment of the invention has been described above. Obviously, modifications will occur to those skilled in the art to which it pertains. Devices other than selsyns might be used to measure the movement of calender rolls to provide signals usable for the purposes explained above. Similarly, devices other than mechanical differentials might be employed for comparison purposes to obtain error control signals. In a like manner, although the preferred embodiment has been described with respect to drive side screwdown motors operating independently of the waterside screwdown motors, the system herein defined is modifiable to be usable with a calender thickness control wherein drive and waterside correction is accomplished simultaneously, e.g., by paralleled drives on both sides for each set of calender rolls or with independent drives operated simultaneously.

I claim:

1. In a sheeting calender apparatus including at least first and second sets of calender rolls, first screwdown means to control the separation between the rolls of said first set of calender rolls, second screwdown means for controlling the separation between the rolls of said second set of calender rolls, thickness-measuring means including first circuit means automatically responsive to deviations from a desired normal in the thickness of said sheet for operating the said screwdown means to adjust the separation between the rolls of said sets to thereby correct the thickness of the sheet, the improvement including:

means monitoring the operation of each of said screwdown means to generate output signals indicative of a differential in the operation of said first screwdown means and the operation of said second screwdown means; and, second circuit means connected to said first circuit means and responsive to said output signals for selectively operating either of said screwdown means so as to eliminate the differential.

2. The apparatus of claim 1 wherein each screwdown means includes a drive side screwdown motor for controlling the separation between rolls on one end and a waterside screwdown motor for controlling the separation between rolls on the other end, and wherein said monitoring means includes signal generator means for each of said screwdown motors and responsive thereto for providing signals representative of the movement of said motors, and output signal generator means responsive to a differential output from the signal generator means associated with drive side screwdown motors for producing a first output signal to said second circuit means and responsive to a differential output from the signal generators associated with waterside screwdown motors for producing a second output signal to said second circuit means, said second circuit means being responsive to said first and second output signals respectively to selectively deenergize the screwdown motors.

3. The apparatus of claim 2 wherein each signal generator means comprises a selsyn transmitter and wherein said output signal generator means includes a first pair of opposed selsyn receivers for operating a drive side control means and a second pair of opposed selsyn receivers for operating a waterside control means.

4. The apparatus of claim 3 wherein each control means comprises a mechanical differential coupled to said selsyns and having an output operator positioned so as to operate a pair of switches.

6. In a laminar sheet producing apparatus provided with two sets of calender sheeting rolls, each set of rolls producing a lamina of said sheet and being adjustable by individually controllable screwdown devices operatively connected to each end of each set of rolls, and the apparatus including laminar sheet thickness correction means providing control signals simultaneously to screwdown devices located on the same sides of said sets of rolls to adjust the devices so as to maintain a predetermined total thickness of the laminar sheet on one side and providing control signals sequentially to the screwdown devices on the opposite sides of the sets of rolls to adjust the devices so as to maintain a predetermined total thickness of the laminar sheet on its other side the improvement which includes:

first and second sets of signal generators each set being located on opposite sides of said sets of rolls and providing output signals representative of the movement of the screwdown devices, differential means connected to said sets of signal generators and responsive to said output signals for providing laminae thickness correction control signals; and, circuit means operable with said laminar thickness correction means and responsive to said laminae thickness correction control signals for selectively controlling said screwdown devices to control correction of laminae thickness.

7. Apparatus according to claim 6 wherein each signal generator comprises a selsyn system and wherein said differential means comprises at least two mechanical differentials and switching means operable by two selsyn systems such that the switching means provides said laminae thickness correction control signals.

8. Apparatus according to claim 6 wherein said circuit means includes relays operable upon receipt of a laminae thickness correction control signal to deenergize a screwdown device so long as the signal persists and capable of restarting the screwdown device upon removal of the signal.

* * * * *